United States Patent
Pettit et al.

(10) Patent No.: US 8,131,676 B2
(45) Date of Patent: *Mar. 6, 2012

(54) UPDATING MEDIA-LOCATION DATA FOR MEDIA-PLAYING ENTITIES

(75) Inventors: Bradley R. Pettit, Los Gatos, CA (US); Junmin Hao, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 356 days.

This patent is subject to a terminal disclaimer.

(21) Appl. No.: 12/418,224

(22) Filed: Apr. 3, 2009

(65) Prior Publication Data

US 2010/0257216 A1     Oct. 7, 2010

(51) Int. Cl.
*G06F 17/30* (2006.01)

(52) U.S. Cl. .......... 707/625; 707/716; 707/803; 725/10; 725/51

(58) Field of Classification Search ................. 707/803, 707/625, 716; 725/10, 51
See application file for complete search history.

(56) References Cited

U.S. PATENT DOCUMENTS

| | | |
|---|---|---|
| 6,226,692 B1 | 1/2001 | Miloushev |
| 6,438,618 B1 | 8/2002 | Lortz |
| 6,505,241 B2 | 1/2003 | Pitts |
| 6,651,217 B1 | 11/2003 | Kennedy et al. |
| 6,704,804 B1 | 3/2004 | Wilson |
| 6,751,665 B2 | 6/2004 | Philbrick et al. |
| 7,216,292 B1 | 5/2007 | Snapper et al. |
| 7,398,473 B2 | 7/2008 | Stoner |
| 7,424,717 B2 | 9/2008 | Blevins |
| 7,437,376 B2 | 10/2008 | Sikchi |
| 7,441,253 B2 | 10/2008 | Atkinson |
| 7,460,443 B2 | 12/2008 | Elmers et al. |
| 7,475,384 B2 | 1/2009 | Heath |
| 7,483,870 B1 | 1/2009 | Mathew |
| 2002/0118300 A1 | 8/2002 | Middleton et al. |
| 2002/0156556 A1 | 10/2002 | Ruffner |
| 2002/0156840 A1 | 10/2002 | Ulrich et al. |
| 2004/0057348 A1 | 3/2004 | Shteyn et al. |
| 2004/0218894 A1* | 11/2004 | Harville et al. ............. 386/46 |
| 2005/0114757 A1 | 5/2005 | Sahota et al. |
| 2005/0172309 A1* | 8/2005 | Risan et al. .................. 725/1 |
| 2005/0188350 A1 | 8/2005 | Bent et al. |
| 2005/0278737 A1 | 12/2005 | Ma |
| 2006/0021057 A1* | 1/2006 | Risan et al. .................. 726/26 |
| 2006/0070083 A1 | 3/2006 | Brunswig |
| 2006/0074981 A1 | 4/2006 | Mauceri |
| 2006/0143236 A1* | 6/2006 | Wu ......................... 707/104.1 |
| 2006/0248451 A1 | 11/2006 | Szyperski |

(Continued)

FOREIGN PATENT DOCUMENTS

WO     2004027606 A1     4/2004

(Continued)

OTHER PUBLICATIONS

"Orban/Coding Technologies AAC/aacPlus Player Plugin", retrieved at <<http://www.orban.com/plugin/Read_Me.html>>, Apr. 2008, pp. 1-14.

(Continued)

*Primary Examiner* — Hanh Thai

(57) ABSTRACT

This document describes tools capable of updating media-location data for media-playing entities. These tools allow a developer of an application to use data binding to update media-location data for the media-playing entities without the need to write custom code.

16 Claims, 7 Drawing Sheets

U.S. PATENT DOCUMENTS

| | | | |
|---|---|---|---|
| 2006/0270462 A1* | 11/2006 | Chi | 455/566 |
| 2007/0124460 A1 | 5/2007 | McMullen | |
| 2007/0139441 A1 | 6/2007 | Lucas | |
| 2007/0226353 A1* | 9/2007 | Ruul | 709/227 |
| 2008/0033806 A1 | 2/2008 | Howe et al. | |
| 2008/0064351 A1 | 3/2008 | Landschaft et al. | |
| 2008/0114810 A1 | 5/2008 | Malek | |
| 2008/0134250 A1 | 6/2008 | Liu | |
| 2008/0205205 A1 | 8/2008 | Chiang et al. | |
| 2008/0282083 A1* | 11/2008 | Risan et al. | 713/153 |
| 2008/0301803 A1 | 12/2008 | Ontaneda | |
| 2008/0313650 A1 | 12/2008 | Arnquist | |
| 2008/0319856 A1 | 12/2008 | Zito et al. | |
| 2009/0138502 A1* | 5/2009 | Kalaboukis et al. | 707/104.1 |
| 2009/0198744 A1* | 8/2009 | Nakamura | 707/201 |
| 2009/0204719 A1* | 8/2009 | Simongini et al. | 709/231 |
| 2010/0095337 A1 | 4/2010 | Dua | |
| 2010/0165877 A1* | 7/2010 | Shukla et al. | 370/254 |
| 2010/0241527 A1* | 9/2010 | McKenna et al. | 705/27 |
| 2010/0241669 A1 | 9/2010 | Pettit | |
| 2010/0257540 A1 | 10/2010 | Schuler | |
| 2010/0299620 A1 | 11/2010 | Sharma | |

FOREIGN PATENT DOCUMENTS

| | | |
|---|---|---|
| WO | WO2004027606 | 4/2004 |

OTHER PUBLICATIONS

"DMP-6000 Network High Definition Digital Signage Media Player & Content Distribution Server (CDS) Software platform", Retrieved from <http://www.gctglobal.com/Products/Set_Top_Box/set_top_box.html>.

"Set-Top Box Design Template", Retrieved from <http://msdn.microsoft.com/en-us/library/ms924238.aspx>.

"SeaChange IPTV", Retrieved from <http://www.schange.com/en-US/Docs/Public/products/IPTV_TVNav_BR_7-11-2008.pdf>.

"Data Binding Between Controls in Windows Forms", Retrieved from <http://msdn.microsoft.com/en-us/magazine/cc301575.aspx>.

"How to: Ensure Multiple Controls Bound to the Same Data Source Remain Synchronized", Retrieved from <http://msdn.microsoft.com/en-us/library/ms404299.aspx>.

"Manipulating Data through a Binding Source", Retrieved from <http://my.safaribooksonline.com/032126892X/ch04Iev1sec5>.

"Palm Prē", Retreived from <<http://www.palm.com/us/products/phones/pre/>> on Apr. 24, 2009, Scroll down to "Connected Calendars and Contacts and click on "See Gallery"—Images 6, 7 and 8, entitled "Contacts," "Linked Contact" and "Linked Contact",1-7.

"Orban/Coding Technologies AAC/aacPlus Player Plugin", Retreived at <http://www.orban.com/plugin/Read_Me.html>.

"Best Practices for NI TestStand User Interface Development", Retrieved from: http://zone.ni.com/devzone/cda/tut/p/id/7560_on Feb. 4, 2009., (Jul. 15, 2008),10 Pages.

Clausen, Joern "Attaching Data to Timeline Event", Retrieved from: http://www.mail-archive.com/general@simile.mit.edu/msg00966.html on Feb. 4, 2009., 2 Pages.

Hallberg, Aaron "Attaching Custom Data to a Build", Retrieved from: http://blogs.msdn.com/aaronhallberg/archive/2008/05/27/attaching-custom-data-to-a-build.aspx on Feb. 4, 2009., 3 Pages.

"Custom Event Classes", Retrieved from: http://wiki.wxpython.org/CustomEventClasses on Feb. 4, 2009., 1 Page.

"Load Content While Scrolling", posted at WebResource Depot, (Jun. 3, 2008), 3 pages.

"Non-Final Office Action", U.S. Appl. No. 12/406,816, (Jun. 27, 2011), 14 pages.

"Non-Final Office Action", U.S. Appl. No. 12/471,026, (Jun. 23, 2011), 18 pages.

Barton, John et al., "Sensor-Enhanced Mobile Web Clients: an XForms Approach", in Proceedings of WWW 2003,(May 2003), pp. 80-89.

Berseth, Matt "ASP.NET Ajax Auto-Complete Control", (Jan. 10, 2008), 5 pages.

Merlino, Andrew "Paging in ASP.NET", (Sep. 10, 2003), 4 pages.

"Final Office Action", U.S. Appl. No. 12/406,816, (Jan. 20, 2012), 16 pages.

"Final Office Action", U.S. Appl. No. 12/471,026, (Oct. 28, 2011), 22 pages.

Faltstrom, P. "E.164 Number and DNS", *Network Working Group*, Retrieved from:<http://www.ietf.org/rfc/rfc2916.txt> on Jan. 4, 2012, (Sep. 2000), 7 pages.

* cited by examiner

UPDATING MEDIA-LOCATION DATA FOR MEDIA-PLAYING ENTITIES

BACKGROUND

Media-playing entities are currently used within conventional computer programs and web pages to access playlists. These playlists can contain paths to media content that the media-playing entities will play. The entities may do so by directly accessing the playlist data. This direct access is accomplished through custom code created for and located on the computer program having the media-playing entities.

Managing this custom code can be time consuming, expensive, or error prone. The custom code may require updates for each computer program or webpage or other time-consuming management. The custom code may rely on management by a software developer that does not have sufficient skill to easily manage the custom code, such as when the custom code is written by one developer and managed by another. Further, even the most skilled developer may inadvertently or maliciously cause problems for a provider of data.

While management of the custom code presents one possible issue in current computer programs or webpages, a problem may also exist in the way that media-playing entities access playlist data. Each media-playing entity individually requests the playlist data from a data location, which can be inefficient or resource intensive.

SUMMARY

This document describes tools capable of updating media-location data for media-playing entities. These tools allow a developer of an application to use data binding to update media-location data for media-playing entities without the need to write custom code. These tools may also reduce requests from media-playing entities to a data location, which may increase efficiency or reduce resources used.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

Figure 1:
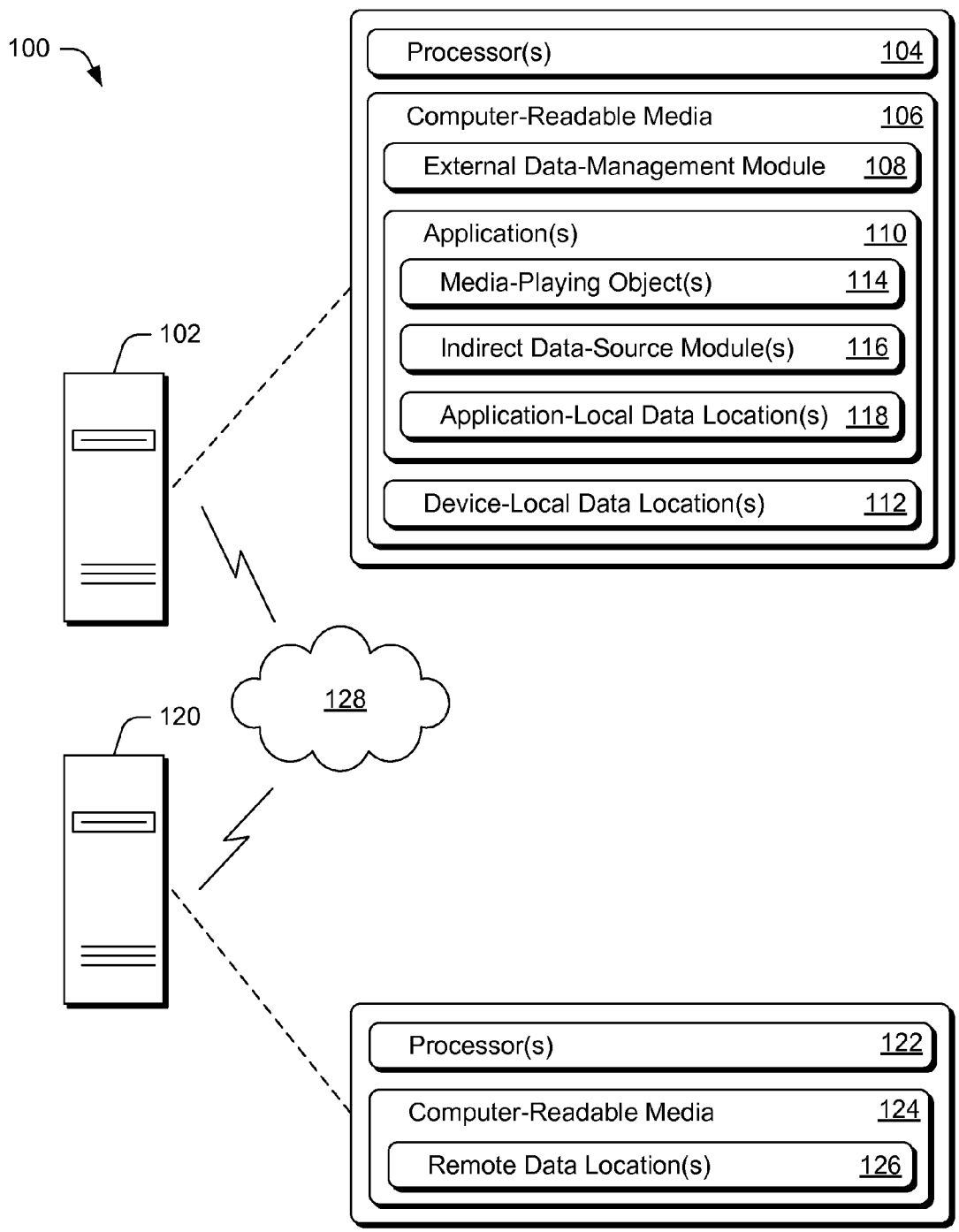
FIG. 1 is an illustration of an environment in which data binding may be used in an application without the need for custom code utilizing an external data-management module.

This document describes tools capable of allowing a developer of an application to update media-location data for media-playing entities. The tools accomplish this by binding media-playing entities to media-location data without the need to write custom code. The tools also allow multiple media-playing entities to access the media-location data through a single point of redirection. This reduces the number of requests to a data location containing the media-location data and therefore allows more applications to simultaneously access the media-location data. The tools may be distributed in a software development kit (SDK) provided to the developer. Full control of the custom code needed to do the data binding may remain in the hands of the makers of the SDK. This may provide increased reliability of developed applications or save development time and money.

In one embodiment the tools update media-location data using an external entity that manages media-location data at one or more data locations. This external entity is deployed on the computing device running the application but is external to the application. The tools may also contain a module to be embedded by the developer within the application. This internal module communicates with the external entity and enables a developer to declare a data path for one or more media-playing entities relative to the internal module. The developer may then assign the internal module a data-location path, which the internal module may register with the external entity. The external entity then monitors the data-location path for appropriate media-location data updates. When the external entity detects a change to the media-location data it passes the changed media-location data on to the internal entity. The internal entity updates the media-playing entities with the changed data to which they are bound.

The tools enable a developer to update the media-playing entities without the need to write custom data-binding code. Furthermore, a change to the data location, such as moving the media-location data from one server to another, is easily handled by a simple change to the data-location path within the application.

In another embodiment the internal module manages the media-location data and the external entity is not used. In this embodiment the custom code is located within the application and therefore the application may need to be updated if the custom code requires a change. The custom code may still be controlled by the makers of the SDK when the internal module is provided with the SDK.

If multiple media-playing entities are used with either of these embodiments, each may forgo requesting the media-location data from the data location. The internal module or the external entity, depending on the embodiment, can make one request for all the bound media-playing entities. This reduces the number of total requests to the data location and enables that data location to serve more applications.

Example Environment

FIG. 1 is an illustration of an example environment 100 in which the tools may enable an application to bind one or more media-playing entities to media-location data without the need for custom code within the application. Environment 100 includes a first computing device 102. Examples of computing device 102 include a set-top box, a personal computer, a media player, and a smart phone to name a few. Computing device 102 includes one or more processors 104 and computer-readable media 106. Computer-readable media 106 contains or has access to an external data-management module 108, one or more applications 110, and one or more optional device-local data locations 112.

External data-management module 108 is external to applications 110 and configured to manage media-location data located at data locations, such as data location 112. In this environment, device-local data locations 112 are local to computing device 102 but not located within applications 110. External data-management module 108 enables developers of applications 110 to manage media-location data from a variety of data locations. External data-management module 108 may filter the media-location data from data locations 112, such as based on a current state of computing device 102, user preferences, or other information. In another embodiment, external data-management module 108 is located on a different computing device and has remote access to information on computing device 102.

Each of applications 110 can be of varying different types, such as a web application, a web service, a word processor, or an executable. Applications 110 may contain one or more media-playing objects 114, indirect data-source modules 116, and/or application-local data locations 118. Application-local data locations 118 and device-local data locations 112 contain media-location data that one or more media-playing objects 114 may use to locate media content to play.

A device-local data location 112 may be located on a removable computer-readable storage medium attached to computing device 102, such as a DVD, compact disk, USB flash drive, or USB hard drive. Data locations 112 may be located on permanent computer-readable storage media located on computing device 102, such as a hard drive and random access memory. Data locations 112 contain media-location data that one or more media-playing objects 114 may use to locate media content to play. An example of a device-local data location 112 would be an xml (eXtensible Markup Language) file located on a hard drive within computing device 102.

Media-playing objects 114 are objects that play and/or record media content and consume media-location data. Media-location data consists of one or more playlists containing one or more media-location paths that address media content. Some examples of media content include audio files, video files, and image files. Some examples of media-playing objects 114 include a video playing object, an audio playing object, an image displaying object, or an audio and/or video recording object. Each of media-playing objects 114 is configured to reference media-location data indirectly through indirect data-source modules 116.

Indirect data-source modules 116 are configured to communicate with external data-management module 108. Indirect data-source modules 116 inform external data-management module 108 of a data location that external data-management module 108 will manage. Indirect data-source modules 116 may receive media-location data updates from external data-management module 108. Indirect data-source modules 116 may also communicate media-location data updates to those media-playing objects 114 that want to consume the media-location data.

Media-playing objects 114 may also or instead reference media-location data directly through external data-management module 108. In this case each of media-playing objects 114 may include code embedded to carry out the duties of indirect data-source module 116. Application-local data locations 118 are data locations within the application that may be directly or indirectly bound to. Data locations 118 contain media-location data that one or more media-playing objects 114 may use to locate media content to play. Examples of data locations 118 include a text box with one or more paths to media content typed in by a user and a recently played list that contains paths to media content recently played.

Figure 2:
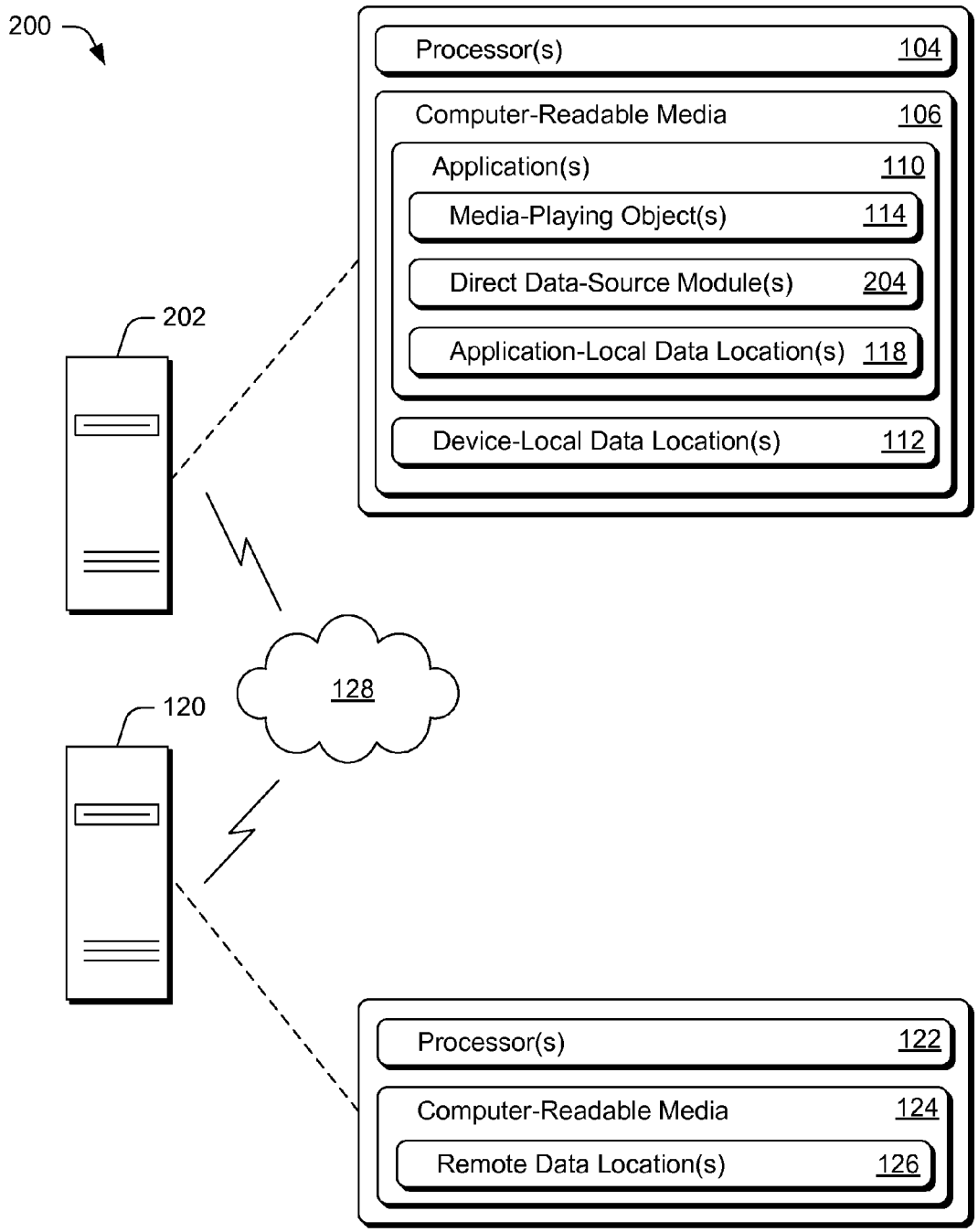
FIG. 2 is an illustration of an environment in which data binding may be used in an application without the need for custom code and without utilizing an external data-management module.

FIG. 2 is an illustration of an example environment 200 with some similarities to example environment 100. Computing device 202 of FIG. 2 is similar to computing device 102 of FIG. 1 with the exception that external data-management module 108 has been removed and one or more direct data-source modules 204 have replaced indirect data-source modules 116. The direct data-source modules 204 perform the actions of both indirect data-source modules 116 and external data-management module 108. To do so, custom code that handles the media-location data is located within the direct data-source modules 204 and thus within the application. This may result in needing to update the application if this custom code ever changes. The custom code, however, may still be controlled and maintained by the provider of the direct data-source modules 204. For this reason the application developer will not be burdened with developing, maintaining, or testing this custom code.

Computing devices 102/202 are optionally configured to communicate with one or more remote computing devices 120, such as a server computer, a personal computer, a media player, or an external storage device. Remote computing device 120 includes one or more processors 122 and computer-readable media 124. Computer-readable media 124 contains or has access to one or more remote data locations 126. Data locations 126 contain media-location data that one or more media-playing objects 114 may use to locate media content to play. Computing device 102 may communicate through a communication network 128 with computing device 120. Communication network 128 may be any network enabling communication between any two or more of the computing devices, such as the Internet, a local-area network, a wide-area network, a wireless network, a USB hub, or a combination of these. A few examples of data locations 112, 118, and 126 include a computer file, a database, a data variable, a web page, a web service, or an eXtensible Markup Language (xml) file.

Generally, any of the functions described herein can be implemented using software, firmware, hardware (e.g., fixed-logic circuitry), manual processing, or a combination of these implementations. The terms "tool" and "module," as used herein generally represent software, firmware, hardware, whole devices or networks, or a combination thereof. In the case of a software implementation, for instance, a module may represent program code that performs specified tasks when executed on a computing device's processor (e.g., CPU or CPUs). The program code can be stored in one or more computer-readable memory devices, such as computer-readable media 106 and/or 124. The features and techniques of the tools are platform-independent, meaning that they may be implemented on a variety of commercial computing platforms having a variety of processors.

Figure 5:
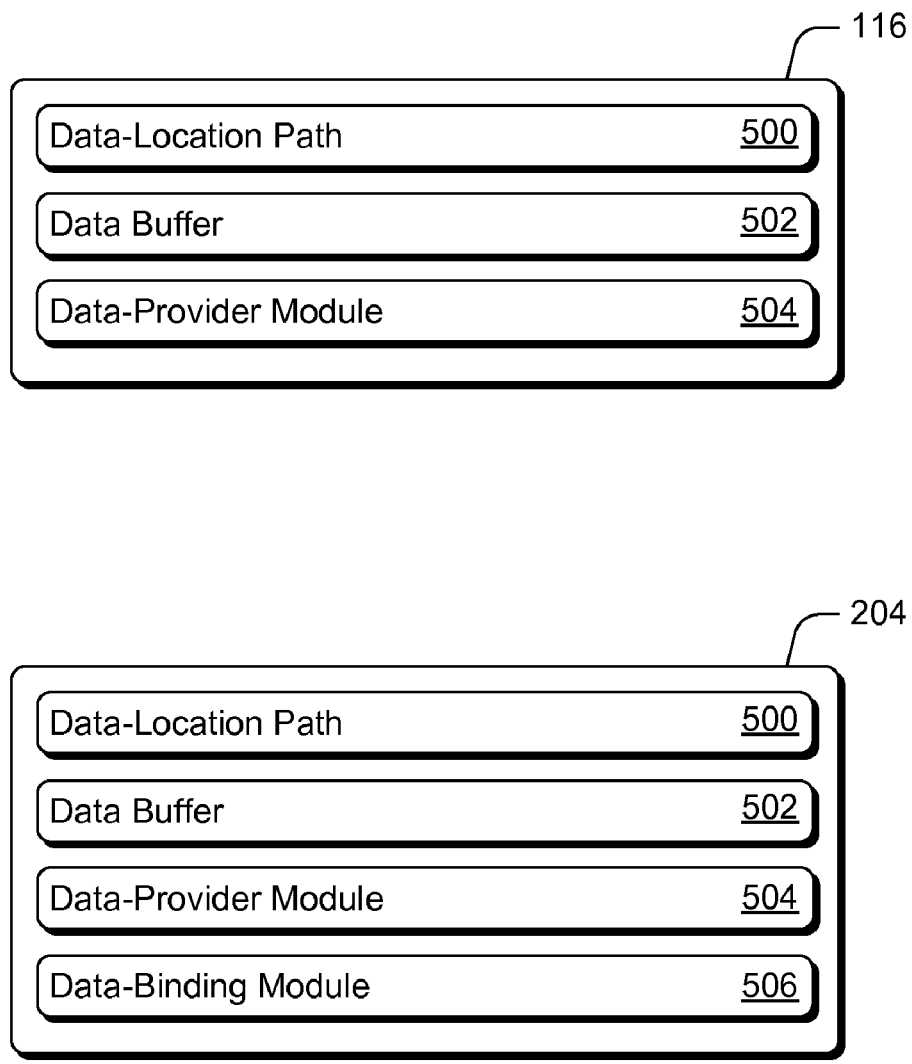
FIG. 5 is a more-detailed illustration of examples of the indirect data-source module of FIG. 1 and the direct data-source module of FIG. 2.
Figure 6:
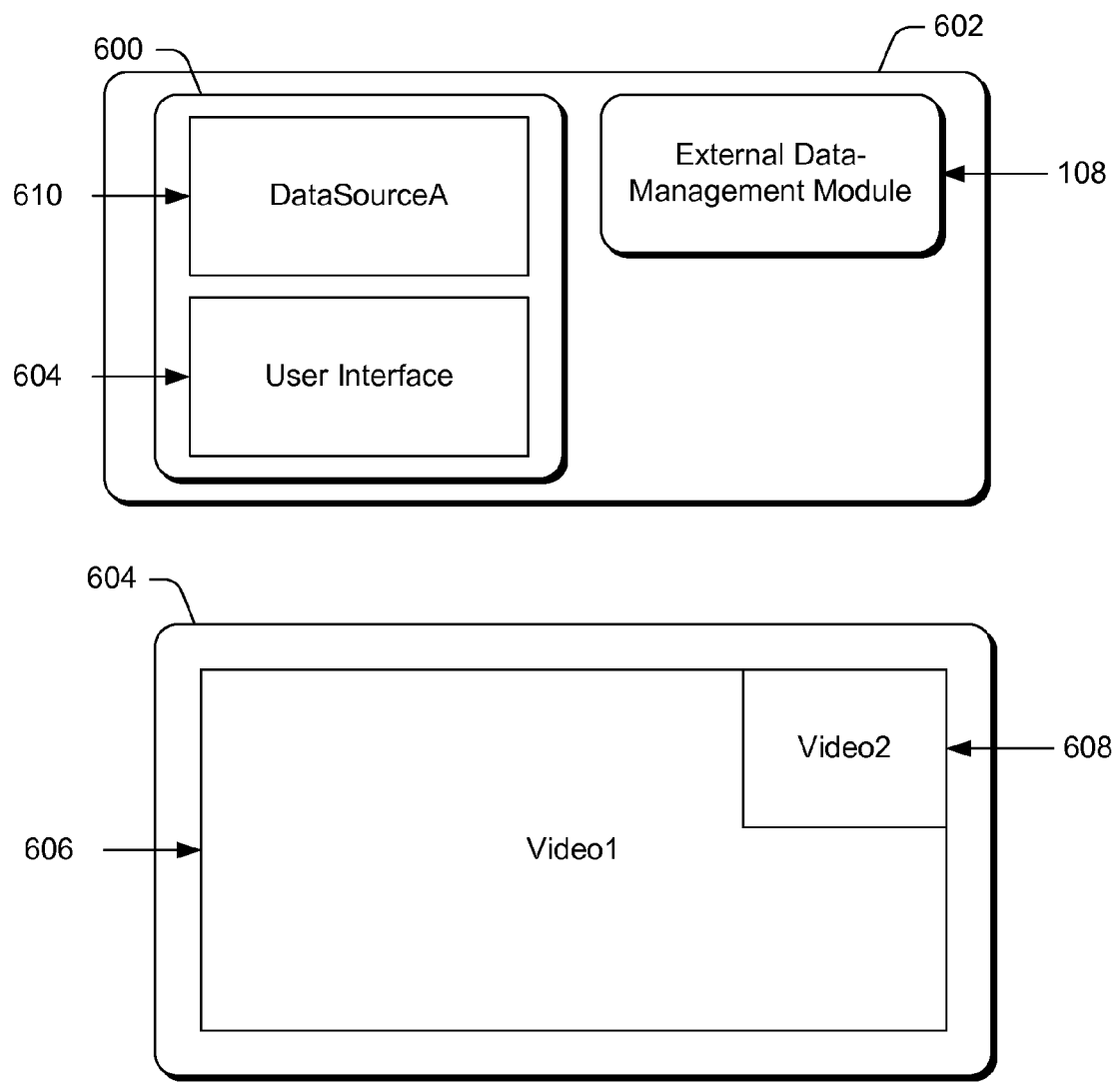
FIG. 6 is an illustration of an example set-top box, web application, and user interface usable to implement at least part of the processes of FIGS. 3, 4, and/or 7.

Example Process for Providing Data Binding Directly or Indirectly through an External Entity The following discussion describes ways in which the tools may operate to enable an application's media-playing entities to bind to media-location data without the application's developer needing to write data-binding code. The tools also operate in a manner that may reduce requests made to a data location thereby allowing more applications to be serviced by the data location. Aspects of this and any other processes may be implemented in hardware, firmware, software, or a combination thereof. These processes are shown as sets of blocks that specify operations performed by the tools, such as through one or more modules or devices and are not necessarily limited to the order shown for performing the operations by the respective blocks. In portions of the following discussion reference may be made to environment 100 of FIG. 1 and environment 200 of FIG. 2. Reference may also be made to FIGS. 5 and 6.

Figure 3:
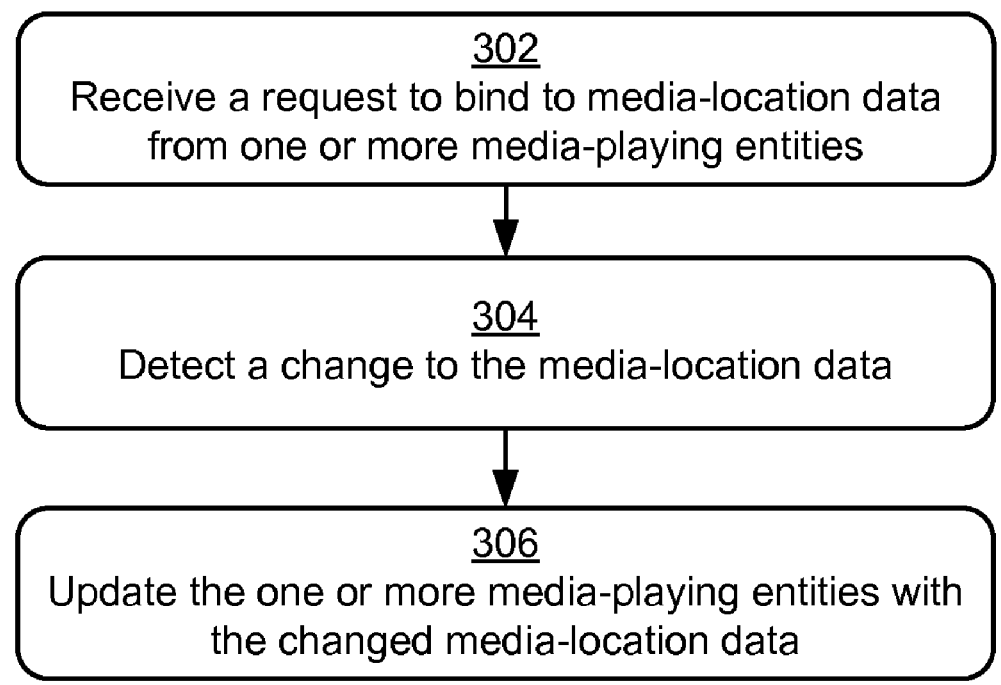
FIG. 3 is a flow diagram depicting an example process, including binding data for one or more media-playing entities.
Figure 4:
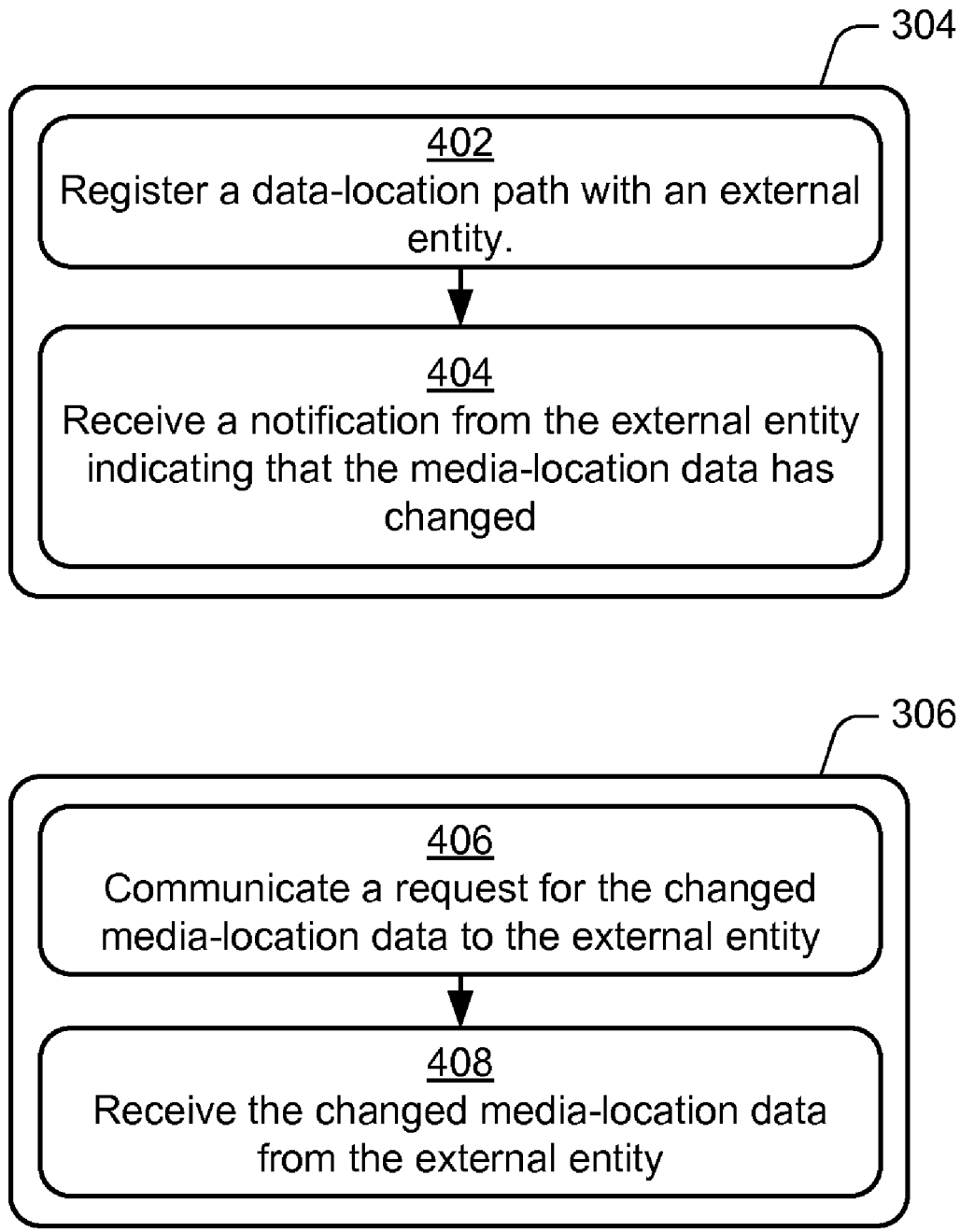
FIG. 4 is an example of manners in which two blocks of the flow diagram of FIG. 3 may act, including binding data for one or more media-playing entities using an external entity.

FIGS. 3 and 4 are flow diagrams depicting an example process 300 for binding to media-location data in a way that limits the amount of custom code managed by an application's developer and reduces the number of requests (also known as "stress") on a data location that contains the media-location data. An example user interface and system layout is described as part of this example process, though other user interfaces and system layouts are also contemplated.

Block 302 receives a request to bind to media-location data from one or more media-playing entities. The media-location data is located within a data location specified by a data-location path. In one embodiment the request is received at runtime by a call from the media-playing entities. In another embodiment the request is stored at a particular location that is checked in block 302 and the data is retrieved. This request, in some cases, is received through a simple declaration within the application's code or markup.

By way of example, consider FIGS. 5 and 6. Item 116 of FIG. 5 corresponds with indirect data-source module 116 of FIG. 1. This example of indirect data-source module 116 includes data-location path 500, data buffer 502, and data-provider module 504. Item 204 of FIG. 5 corresponds with direct data-source module 204 of FIG. 2. This example of direct data-source module 204 includes data-location path 500, data buffer 502, data-provider module 504, and data-binding module 506. The information stored in data-location path 500 is assigned (e.g., by a developer) to an application, such as the web application depicted in FIG. 6 at 600. The labels of FIG. 6 correlate to the proper names used in the example markup shown in Table I below.

TABLE I

```
<Page>
<Video id="Video1" DataSource="{Binding Source=DataSourceA,
path=myTuneUrl[1]}" />
<Video id="Video2" DataSource="{Binding Source=DataSourceA,
Path=myTuneUrl[2]}" />
  <DataSource id="DataSourceA"
Url="http://www.contoso.com/webservice.aspx" />
</Page>
```

Web application 600 is located on set-top box 602 and includes a user interface 604. User interface 604 includes a video-playing object 606 named Video1 and a video-playing object 608 named Video2. These objects are all examples of media-playing objects 114 of FIGS. 1 and 2 and of the media-playing entities of this method. Web application 600 also includes an example of indirect data-source module 116 or direct data-source module 204. They are both represented in FIG. 6 by DataSourceA 610. DataSourceA 610, while not displayed to the user of the application, performs a role in the example embodiment. As shown in lines 2 and 3 of the example markup in Table I (each line of Table I starting with "<" and ending with ">"), each object references DataSourceA 610 as its data-binding source. This is an example of a simple declaration within an application's markup that requests to bind as in block 302.

Block 304 detects a change to the media-location data. Detecting a change may involve receiving a notification from the data-location that the media-location data has been updated. Detecting a change may involve actively checking the media-location data and comparing it against a previously checked version of the data. A change has occurred when there is a difference between a current version of the media-location data and a previously checked version of the media-location data. A change has also occurred when the media-location data is checked for the first time since some data is different than no data. Continuing our example, in one embodiment, DataSourceA 610 is an example of direct data-source module 204 and data-binding module 506 of DataSourceA 610 directly monitors and detects a change to the media-location data located at the data-location specified by data-location path 500.

In another embodiment, DataSourceA 610 is an example of indirect data-source module 116. Also in this embodiment block 304 uses external data-management module 108 to detect a change.

FIG. 4 is an expanded view of examples of blocks 304 and 306 of FIG. 3. This view includes blocks that may be added in various example embodiments, such as for those in which DataSourceA 610 is an indirect data-source module 116 that communicates with external data-management module 108. Block 402 of FIG. 4 registers the data-location path with an external entity. The data-location path is first defined (e.g., by the developer) within the application. The data-location path is a path to a data location that contains media-location data to which one or more media-playing entities in the application may wish to bind. Registering the data-location path with the external entity may involve communicating the data-location path to the external entity. The external entity may then monitor the data location specified by the data-location path. In some cases both the external entity and the application are provided with a pre-defined data-location path in which case block 402 may be skipped.

Continuing our example, data-provider module 504, within DataSourceA 610, registers data-location path 500 with external data-management module 108. On the fourth line of the example markup, DataSourceA 610 is assigned a Uniform Resource Locator (URL) to a web service. This URL is stored as data-location path 500 of FIG. 5 and is an example of a data-location path registered in block 402 of FIG. 4. The path values in lines 2 and 3 of the example markup (Table I) reference specific media-location data values at DataSourceA 610. DataSourceA 610 populates specific media-location data values with media-location data from a data location specified by data-location path 500. These specific media-location data values may contain one or more playlists each containing one or more media-location paths that address media content that media-playing objects 114 (Video1 606 and Video2 608) may attempt to play.

Block 404 receives a notification of changed data from the external entity. This notification may be responsive to the media-location data being checked by the external entity for the first time or because the media-location data has changed since last checked. Continuing the ongoing example, DataSourceA 610 (an indirect data-source module 116) receives a notification from external data-management module 108 as in block 404. The notification informs DataSourceA 610 that media-location data at the data location specified by data-location path 500 has changed. In some embodiments, the external data-management module 108 is configured to automatically communicate the changed media-location data. In such an embodiment, block 404 is skipped. Receiving changed data from external data-management module 108 may also cause DataSourceA 610 to be notified that it is changed, implicit in the fact that the changed data is being received. Note, however, that a separate notification block, such as block 404, may not be present if the data is communicated automatically.

Block 306 of FIG. 3 updates the one or more media-playing entities with the changed media-location data. Continuing the ongoing example, DataSourceA 610 is either a direct data-source module 204 or an indirect data-source module 116. In the embodiment in which DataSourceA 610 is a direct data-source module 204, data-binding module 506 of DataSourceA 610 directly retrieves the changed media-location data and stores it in data buffer 502. Alternatively, data-binding module 506 may communicate the changed media-location data to data-provider module 504 which then stores it in data buffer 502. In either case, data-provider module 504 communicates the changed media-location data to Video1 606 and Video2 608 in block 306. In one embodiment the changed media-location data is communicated to the bound media-playing objects (606 and 608) by informing the media-playing objects of the changed data. The media-playing objects then retrieve the data from data buffer 502. In another embodiment, a variable of each media-playing object is modified to contain the changed data by data-provider module 504.

In the embodiment in which DataSourceA 610 is an indirect data-source module 116, DataSourceA 610 relies upon external data-management module 108 to retrieve the changed media-location data from the data location. Block 406 of FIG. 4 communicates a request for the changed media-location data to the external entity. Block 408 receives the changed media-location data from the external entity. Continuing this example, DataSourceA 610 communicates a request for the changed media-location data to external data-management module 108 as in block 406. Upon receiving the changed media-location data (block 408), DataSourceA 610 stores the changed media-location data in data buffer 502. DataSourceA 610 then updates Video1 606 and Video2 608 with the changed media-location data as in block 306 of FIG. 3. This updating is performed by data-provider module 504, which informs the media-playing entities (606 and 608) of the changed data.

The objects may then retrieve the changed data from data buffer 502. The data updated can be one or more URLs of video content for Video1 606 to play, for example. Video1 606 retrieves this data from data buffer 502 via path myTuneUrl[1] of Table I.

The data updated can also be one or more URLs of video content for Video2 608 to play. Video2 608 retrieves this data from data buffer 502 via path myTuneUrl[2] of Table I. Alternatively, in some embodiments data-provider module 504 actively updates a data variable within the objects with the changed data. In those embodiments each data binding specification in lines 2 and 3 of Table I may contain a data variable located within each media-playing object (606 and 608) but accessible by data-provider module 504. In some cases the data variable located within each media-playing object (606 and 608) is not specified in the data binding specifications, but is known and accessible by data-provider module 504. Data-provider module 504 may actively set the data variable to the newly changed media-location data values in block 306 in some of these embodiments.

Example Device

Applications, such as application 600, may be used in various devices. Consider, by way of example, a set-top box 602 connected to a television. Application 600 may run on such a set-top box 602 and with it a user can preview channels to find something to watch while watching something else. A user can watch a video in Video1 606 and at the same time preview other videos in Video2 608.

In the background, the external data-management module 108 downloads media-location data (e.g., from "webservice-.aspx" at Table I, line 4). The media-location data includes a single media-location for video content that Video1 606 plays. It also includes multiple media-locations for multiple video preview clips that Video2 will cycle through. Indirect data-source module 116 (DataSourceA 610) is informed of the changed data and communicates a request for the changed data. Responsive to receiving the changed data indirect data-source module 116 (DataSourceA 610) updates Video1 606 and Video2 608. The video objects then play the media content addressed by the media-location data provided by DataSourceA 610.

Application 600 may forgo code capable of knowing that this is occurring. Application 600, rather, may display whatever data external data-management module 108 tells it to display. In one embodiment, Video2 608 plays through a list of media locations provided by external data-management module 108 through DataSourceA 610. In another embodiment external data-management module 108 provides a single media location at a time and Video2 608 plays it. If, for example, a user sees something that he would like to watch in Video2 608 he may press a button on his remote control, after which external data-management module 108 switches the data value for Video1 606 to the media location for the desired video content.

Example Process for Binding to Media-Location Data

Figure 7:
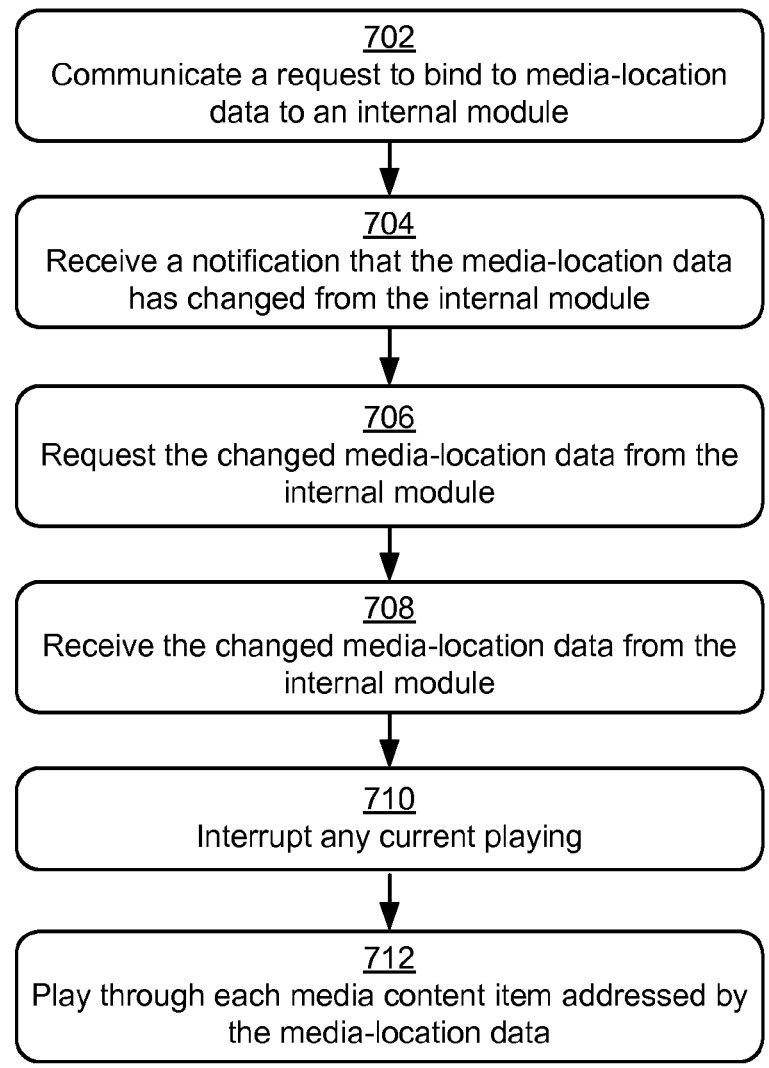
FIG. 7 is a flow diagram depicting an example process in which the tools bind to data through a data source.

FIG. 7 depicts a process 700 in which the tools enable a media-playing object within an application to bind to media-location data. An example user interface and system layout is described as part of this example process, though other user interfaces and system layouts are also contemplated. Media-playing objects 114 of FIGS. 1 and 2 are examples of the media-playing object that can be used in this process.

Block 702 communicates a request, to an internal module, to bind to media-location data. This request may be communicated by a simple declaration within the application as described above, by calling a function exposed by the internal module, or by some other communication means. By way of example consider FIG. 6 and Table I previously introduced above. Application 600 contains the markup of Table I. Lines 2 and 3 of Table I show Video1 606 and Video2 608 declaring that they are bound to data contained within the defined paths (myTuneUrl[1] and myTuneUrl[2]) located at DataSourceA 610. DataSourceA 610 is an example of the internal module of this process. DataSourceA 610 may be an indirect data-source module 116, which accesses the media-location data through external data-management module 108. DataSourceA 610 may be a direct data-source module 204, which access the media-location data directly.

Block 704 receives a notification that the media-location data has changed from the internal module. The internal module monitors the media-location data or has an external entity monitor the data. When the media-location data has changed a notification is received by block 704. This notification may be received when the internal module calls a function that is exposed (e.g., by a media-playing object), by checking a value that was set by the internal module, or by some other communication means. Block 704 may be skipped in some embodiments, such as those where the changed media-location data is continually requested or continually received without being requested. Continuing the example, Video1 606 and/or Video2 608 receive a notification from DataSourceA 610 informing them that media-location data to which they are bound (myTuneUrl[1] and myTuneUrl[2]) has changed.

Block 706 requests the changed media-location data from the internal module. This request can be in response to receiving a notification in block 704 or as one of many continual or periodic requests for the media-location data. This request may be communicated by calling a function exposed by the internal module, by setting a value that is regularly checked by the internal module, or by some other communication means. In some embodiments, block 706 is skipped because the internal module communicates the data without it being requested. Continuing our example, Video1 606 and/or Video2 608 request the changed media-location data from DataSourceA 610.

Block 708 receives the changed media-location data from the internal module. The changed media-location data may be received when the internal module calls a function that is exposed (e.g., by Video1 606) by checking a value that was set by the internal module or by some other communication means. The changed media-location data contains playlists that contain media-location paths that address media content. Continuing the example, Video1 606 and/or Video2 608 receive the changed media-location data from DataSourceA 610.

Block 710 interrupts any currently playing media content. This optional block is in response to receiving the newly changed media-location data. In some embodiments all currently playing media content is stopped. Upon stopping the play of the media content a queue of items to play may be cleared and replaced with the media-location paths received in block 708. Continuing the example, Video1 606 and/or Video2 608 stop playing whatever they were currently playing. The media content may be completely different media content that the media content that is addressed by the media-location paths within the changed media-location data, such as when the user selects a preview in Video2 608 and Video1 606 begin play of full video content that correlates to the selected preview. The media content may be the same or similar to the media content addressed by the media-location paths within the changed media-location data, such as when new preview playlists are received that contain much of the old playlist but a few new items.

Block 712 plays through each media content item addressed by the media-location paths received in block 708. These media-location paths may be appended to the end of the queue of items to play or may replace it entirely so that any old items are not played. Continuing the example, Video1 606 and/or Video2 608 play media content addressed by media-location paths found within playlists contained in their respective myTuneUrl[X] paths. The media content may be played through one at a time in succession until each media content item is played to completion or new media-location data is received.

Video1 606 and Video2 608 may not be aware that their media-location data is changing or what their media-location data is pointing to. In one embodiment both of these media-playing objects (606 and 608) have little intelligent code. They essentially play whatever they are given and play it to completion. External data-management module 108 or data-binding module 506 of direct data-source module 204 can instead be primarily responsible for determining what each object will play.

In the specific example of a set-top box 602 above, external data-management module 108 can be configured to be aware of a user's selection to preview channels based on information located in set-top box 602. From the data location, external data-management module 108 may fetch media-location data representing one or more channels or video streams. External data-management module 108 then selects the appropriate media-location data and communicates the data to indirect data-source module 116 (DataSourceA 610) for the application to display as described previously. For Video1 606, external data-management module 108 will set the myTuneUrl[1] value to the media-location path of the media content that the user is currently watching or has indicated a desire to watch. For Video2, external data-management module 108 will set the myTuneUrl[2] value to the media-location paths of preview video content that gives the user a quick sample of full video content that can be viewed. For example, a previewed video content item may be a movie trailer and selection of the preview by the user may cause external data-management module 108 to set the value of myTuneUrl[1] for Video1 to the media-location path for the full movie.

CONCLUSION

This document describes tools capable of updating media-location data for media-playing entities. These tools allow a developer of an application to use data binding to update media-location data for the media-playing entities without the need to write custom code. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

detecting a change to media-location data having one or more playlists containing one or more media location paths that each address media content, the media-location data located at a data location specified by a data-location path, the data-location path being an internal property of an application, the detecting a change including:

registering the data-location path with an external entity capable of managing data from one or more data locations, the external entity being external to the application and located on a same computing device as the application, the external entity capable of monitoring the media-location data at the data location for changes; and receiving a notification from the external entity indicating that the media-location data has changed; and responsive to detecting the change, updating one or more media-playing entities with the media-location data that was changed, the one or more media-playing entities being located within the application and referencing the media-location data located at the data location specified by the data-location path through an internal entity located within the application.

2. The method as recited in claim 1, further comprising receiving a request to bind to the media-location data from one of the media-playing entities.

3. The method as recited in claim 1, wherein updating the one or more media-playing entities with the media-location data that was changed comprises:
   receiving the media-location data that was changed from the external entity; and
   communicating the media-location data that was changed to one or more of the one or more media-playing entities.

4. The method as recited in claim 3, further comprising communicating a request to the external entity for the media-location data that was changed.

5. The method as recited in claim 3, further comprising:
   informing the media-playing entities of the change to the data; and
   receiving a request from one or more of the media-playing entities for the data that was changed.

6. The method as recited in claim 1, wherein the media-location data is located within the application prior to detecting a change to the media-location data.

7. The method as recited in claim 1, wherein the media-location data is an eXtensible Markup Language (xml) file.

8. The method as recited in claim 1, wherein the media-location data is located on a remote computing device accessible through a computer network.

9. The method as recited in claim 1, wherein the media-playing entities are configured to use the one or more media-location paths to locate media content and play the media content.

10. A method comprising:
    receiving, at a media-playing entity located within an application, media-location data from an internal module also located within the application, the media-location data having been detected as changed by the internal module, the media-location data comprising one or more playlists containing one or more media-location paths that address media content, the media-location data being from a data location specified by a data-location path, the data location path being a property of the internal module, wherein the internal module, from which the media-location data is received, is configured to communicate the media-location data by:
       registering the data-location path with an external entity capable of managing data from one or more data locations, the external entity being external to the application and located on a same computing device as the application, the external entity capable of monitoring the media-location data at the data location for changes;
       receiving a notification from the external entity indicating that the media-location data has changed; and
       receiving the media-location data that was changed from the external entity; and
    playing the media content addressed by each of the one or more media-location paths.

11. The method as recited in claim 10, wherein playing the media content further comprises using one of the one or more media-location paths to locate the media content.

12. The method as recited in claim 10, further comprising communicating a request to the internal module, the request to bind to the media-location data.

13. The method as recited in claim 10, further comprising, responsive to receiving the media-location data, interrupting current play of previously located media content.

14. The method as recited in claim 10, wherein the media-location data is located on a remote computing device accessible through a computer network.

15. One or more computer-readable storage media having stored thereon, computer-executable instructions that, if executed by a computing device, cause the computing device to perform a method comprising:
    registering a data-location path with an external entity capable of managing data from one or more data locations, the data-location path being an internal property of an application and specifying a data location containing media-location data having one or more playlists containing one or more media location paths that each address media content, the external entity being external to the application and located on a same computing device as the application, the external entity capable of monitoring the media-location data at the data location for changes;
    receiving a notification from the external entity indicating that the media-location data has changed;
    responsive to receiving the notification of the change, communicating a request for the changed media-location data to the external entity;
    receiving the changed media-location data from the external entity; and
    responsive to receiving the changed media-location data, communicating at least part of the changed media-location data to one or more media-playing entities located within the application.

16. The media of claim 15, wherein the external entity detects a change if the changed media-location data is different than a previous version of the media-location data or if the media-location data has not previously been received.

* * * * *